Feb. 20, 1951            R. L. ODOM           2,542,157
GEARING FOR STEERING TWO-WHEEL
OR TWO-TRACK DRIVEN MACHINES

Filed Sept. 22, 1948                                   2 Sheets-Sheet 1

INVENTOR.
Robert L. Odom

BY *Victor J. Evans & Co.*

ATTORNEYS

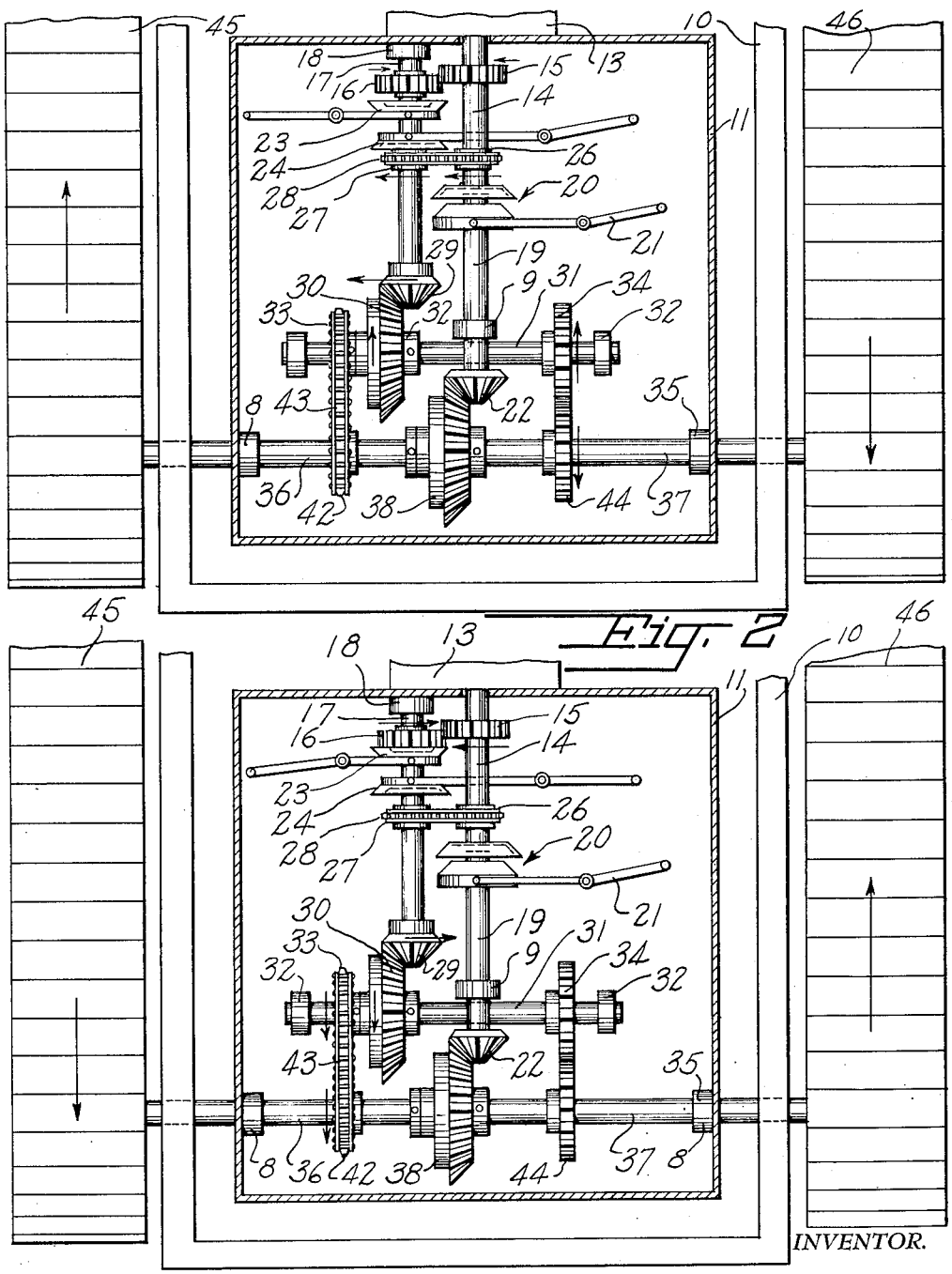

Patented Feb. 20, 1951

2,542,157

UNITED STATES PATENT OFFICE 2,542,157

GEARING FOR STEERING TWO-WHEEL OR TWO-TRACK DRIVEN MACHINES

Robert L. Odom, Waynesboro, Miss.

Application September 22, 1948, Serial No. 50,616

1 Claim. (Cl. 74—664)

This invention relates to a tractor, and more particularly to a tractor provided with gear means for steering the tractor.

An object of the invention is to provide a gear means for a tractor that permits either track to be rotated in a forward or reverse direction to thereby steer or guide the tractor in a desired direction.

Another object of the invention is to provide a tractor having an improved steering gear means compactly constructed and assembled in a housing for protecting the parts from adverse weather conditions.

A further object of the invention is to provide a steering gear means for a tractor which is simple and inexpensive to manufacture.

Other objects and advantages will be apparent during the course of the following description.

In the accompanying drawings forming a part of this application, and in which like numerals are employed to designate like parts throughout the same:

Figure 2 is a fragmentary top plan view of the tractor illustrating the position of the steering gear means during turning of the tractor to the right;

Figure 3 is a fragmentary top plan view of the tractor illustrating the position of the steering gear means during turning of the tractor to the left;

Figure 1:
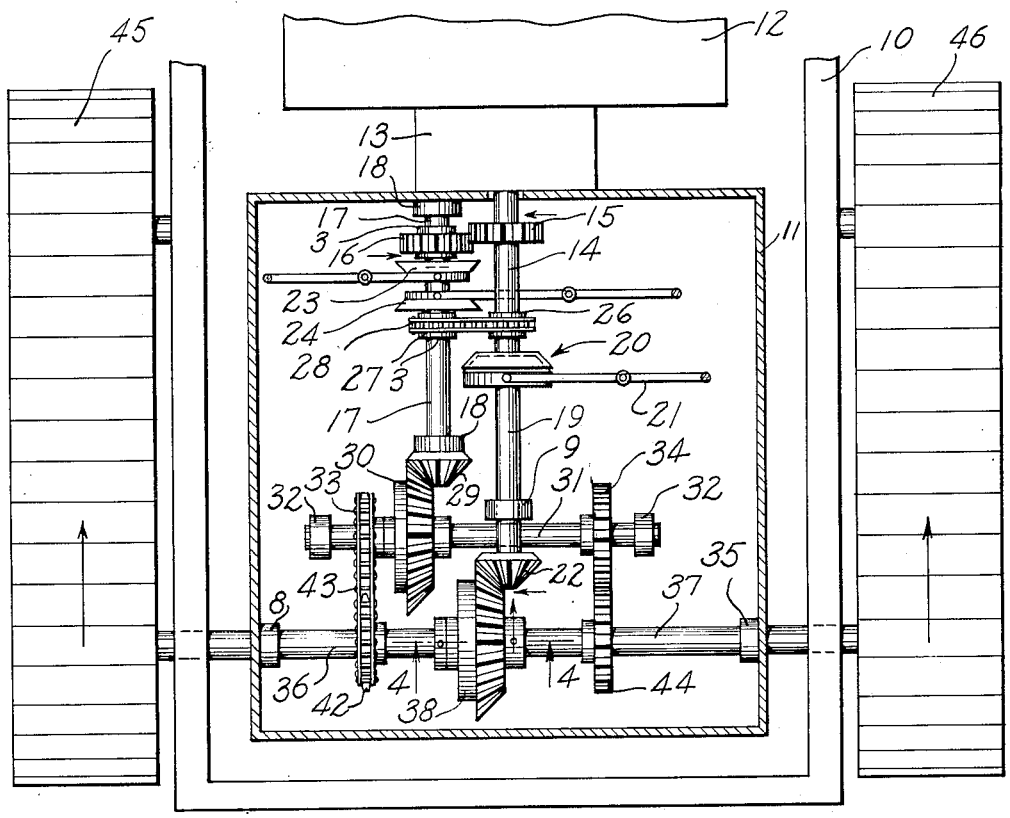
Figure 1 is a fragmentary top plan view of the tractor illustrating the position of the steering gear means during forward movement of the tractor.
Figure 4:
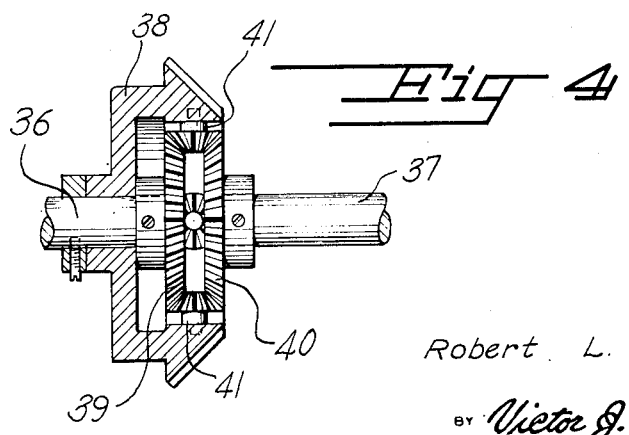
Figure 4 is an enlarged sectional view taken on the line 4—4 of Figure 1.

Referring in detail to the drawings, the numeral 10 designates a frame of a conventional tractor having a rectangular housing 11 arranged therebetween. The tractor further includes a suitable driving means, such as an internal combustion engine 12 and a transmission 13. The housing 11 encloses and protects the gearing means for steering the tractor. The gearing means comprises a main shaft 14 operatively connected to the transmission 13 and secured to the shaft 14 is a gear 15 which is arranged in meshing engagement with a gear 16 on a steering shaft 17 rotatably supported on bearing 18. Arranged in end-to-end relation with respect to the main shaft 14 is a driven shaft 19 which is supported on bearing 9. A clutch element 20 is mounted on the adjacent ends of the shafts 14 and 19 and the clutch element 20 is provided with suitable linkage 21 for moving coacting sections of the clutch element 20 together for causing the shafts 14 and 19 to rotate together. Secured to an end of the shaft 19 is a bevel gear 22 for a purpose to be subsequentially described.

A sprocket 26 is secured on the shaft 19 and is arranged in alignment with a sprocket 27 on the shaft 17, there being a chain 28 trained over the sprockets 26 and 27. The gear 16 and sprocket 27 are rotatably mounted on steering shaft 17, but are prevented from moving longitudinally along the shaft 17 by suitable collars 3. A pair of clutches 23 and 24 are provided with actuating linkage 25 and are operatively connected to the shaft 17. By actuating the clutches 23 or 24, the gear 16 or the sprocket 27 will respectively cause rotation of the shaft 17.

Secured to the end of the shaft 17 is a small bevel gear 29 which meshes with a large bevel or spider gear 30 mounted on the transverse shaft 31, the shaft 31 being rotatably supported on suitable bearings 32.

Mounted on the shaft 31 is a sprocket 33 and spaced from the sprocket 33 is a gear 34. Arranged in spaced, parallel relation with respect to the shaft 31 and rotatably supported on bearings 35 is a pair of axles 36 and 37 rotatably supported on bearings 8 and having their adjacent ends positioned within a differential housing 38. The spider or differential housing 38 meshes with the bevel gear 22 and encloses a pair of confronting differential gears 39 and 40 secured to the adjacent ends of the axles 36 and 37, respectively, and a plurality of rotatable differential pinions 41 are arranged in engagement with the gears 39 and 40 and are carried by the differential housing 38.

Secured to the axle 36 is a sprocket 42 which is in alignment with the sprocket 33 on the shaft 31, there being a chain 43 trained over the sprockets 33 and 42. The other axle 37 carries a gear 44 which is arranged in meshing engagement with the gear 34 carried by the shaft 31.

In operation, the shaft 14 is rotated or driven through the transmission 13 to rotate the bevel gear 22 which in turn rotates the spider housing 38 to rotate the axles 36 and 37 and respective tracks 45 and 46 to drive the tractor forward, Figure 1. Then, to turn the tractor to the right, Figure 2, the clutch 20 is disengaged so that rotation of the bevel gear 22 and spider housing 38 is stopped. Next, the clutch 24 is actuated to cause the sprocket 27 to rotate steering shaft 17 which causes a rotation of the shaft 31. By virtue of the chain and sprocket and gear drive between the shaft 31 and axles 36 and 37, the track 46 will rotate in a reverse direction while the track 45 continues to turn in a forward direction to thereby turn the tractor to the right. In Figure 3, the assembled parts are shown during turning of the tractor to the left. Thus, the clutch 20 is disengaged so that shaft 19 is not rotating. Clutch 23 is actuated to cause the gear 16 to rotate the steering shaft in a clockwise direction which rotates the track 45 in a reverse direction and rotates the track 46 in a forward direction to thereby cause turning the tractor to the left.

As many embodiments may be made of this inventive concept, and as many modifications may be made in the embodiment hereinbefore shown and described, it is to be understood that all matter herein is to be interpreted merely as illustrative and not in a limiting sense.

I claim:

In a transmission, a pair of axles arranged in end-to-end relation with respect to each other, a differential gear unit operatively connected to the adjacent ends of said axles, of a means connected to said axles for selectively controlling the rotation of the latter, said last-named means comprising a main shaft, a steering shaft arranged in spaced parallel relation with respect to said main shaft, gear means on said main shaft and steering shaft for causing rotation of the latter in one direction, chain-and-sprocket means on said main shaft and steering shaft for causing rotation of the latter in the opposite direction, clutch means for selectively actuating said gear means and chain-and-sprocket means, and means operatively connecting said steering shaft to said axles, said last-named means comprising a bevel gear carried by an end of said steering shaft, a rotatable shaft arranged transversely of said steering shaft, a spider gear carried by said rotatable shaft arranged in meshing engagement with said bevel gear, gear means operatively connecting said rotatable shaft to one of said axles, and chain-and-sprocket means operatively connecting said rotatable shaft to said other axle.

ROBERT L. ODOM.

REFERENCES CITED

The following references are of record in the file of this patent:

UNITED STATES PATENTS

| Number | Name | Date |
|---|---|---|
| 851,540 | Martin | Apr. 23, 1907 |
| 1,184,705 | Norelius | May 23, 1916 |
| 1,362,490 | Keck | Dec. 14, 1920 |

FOREIGN PATENTS

| Number | Country | Date |
|---|---|---|
| 607,421 | France | Mar. 27, 1926 |